United States Patent
Park et al.

(10) Patent No.: US 12,299,527 B2
(45) Date of Patent: May 13, 2025

(54) BARCODE SCANNING DEVICE FOR CYLINDRICAL SECONDARY BATTERY

(71) Applicant: LG ENERGY SOLUTION, LTD., Seoul (KR)

(72) Inventors: Gun Hong Park, Daejeon (KR); Tae Kwang Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/698,167

(22) PCT Filed: Dec. 7, 2022

(86) PCT No.: PCT/KR2022/019809
§ 371 (c)(1),
(2) Date: Apr. 3, 2024

(87) PCT Pub. No.: WO2023/106831
PCT Pub. Date: Jun. 15, 2023

(65) Prior Publication Data
US 2024/0403585 A1 Dec. 5, 2024

(30) Foreign Application Priority Data
Dec. 7, 2021 (KR) .................. 10-2021-0174177

(51) Int. Cl.
*G06K 7/10* (2006.01)
*H01M 10/42* (2006.01)

(52) U.S. Cl.
CPC .... *G06K 7/10831* (2013.01); *H01M 10/4221* (2013.01)

(58) Field of Classification Search
CPC .......... G06K 7/10831; H01M 10/4221
See application file for complete search history.

(56) References Cited

U.S. PATENT DOCUMENTS

| 6,588,669 B1 | 7/2003 | Claus |
| 8,857,720 B1 * | 10/2014 | Lei ............ G06K 7/1413 |
| | | 235/462.42 |

(Continued)

FOREIGN PATENT DOCUMENTS

| CN | 204009933 U | 12/2014 |
| CN | 212647140 U | 3/2021 |

(Continued)

OTHER PUBLICATIONS

International Search Report (PCT/ISA/210) issued in PCT/KR2022/019809, mailed Mar. 15, 2023.

(Continued)

*Primary Examiner* — Tuyen K Vo
(74) *Attorney, Agent, or Firm* — Birch, Stewart, Kolasch & Birch, LLP

(57) ABSTRACT

A barcode scanning device for a cylindrical secondary battery which scans a barcode positioned on a side surface of the cylindrical secondary battery, the barcode scanning device including: an illuminator configured to emit light; a barcode reader configured to scan a barcode by receiving the light; sub mirrors which include one sub mirror located relatively close to the barcode reader and another sub mirror located relatively close to the cylindrical secondary battery; and a main mirror configured to reflect, toward the barcode reader, the light which is reflected from the sub mirror located relatively close to the barcode reader. The sub mirror located close to the cylindrical secondary battery is located at a position capable of receiving the light reflected from the side surface of the cylindrical secondary battery, and reflects the received light to the sub mirror located close to the barcode reader.

10 Claims, 7 Drawing Sheets

(56) References Cited

U.S. PATENT DOCUMENTS

| | | | |
|---|---|---|---|
| 10,002,271 B2 | 6/2018 | Olmstead et al. | |
| 10,816,516 B2 | 10/2020 | Tolley et al. | |
| 2001/0042789 A1* | 11/2001 | Krichever | G06K 7/1096 235/462.14 |
| 2007/0181692 A1* | 8/2007 | Barkan | G06K 7/10722 235/462.32 |
| 2008/0135619 A1* | 6/2008 | Kwan | G06K 7/10722 235/462.39 |
| 2010/0163626 A1 | 7/2010 | Olmstead | |
| 2011/0073652 A1 | 3/2011 | Vinogradov et al. | |
| 2012/0018516 A1 | 1/2012 | Gao et al. | |
| 2012/0118963 A1* | 5/2012 | Drzymala | G06K 7/10722 235/454 |
| 2013/0048850 A1* | 2/2013 | Vinogradov | G06K 7/10792 250/271 |
| 2013/0306729 A1 | 11/2013 | Bilks et al. | |
| 2014/0374480 A1 | 12/2014 | Pollack | |
| 2021/0185234 A1 | 6/2021 | Kempf et al. | |

FOREIGN PATENT DOCUMENTS

| | | |
|---|---|---|
| CN | 214012907 U | 3/2021 |
| EP | 2 596 454 B1 | 2/2018 |
| JP | 83-61105 A | 3/1988 |
| JP | 2001-357349 A | 12/2001 |
| JP | 2003-139518 A | 5/2003 |
| JP | 2005-338938 A | 12/2005 |
| JP | 2007-249664 A | 9/2007 |
| JP | 5794692 B2 | 10/2015 |
| KR | 2002-0060045 A | 7/2002 |
| KR | 2003-0089035 A | 11/2003 |
| KR | 10-1036045 B1 | 5/2011 |
| KR | 10-2013-0097015 A | 9/2013 |
| KR | 10-2020-0144385 A | 12/2020 |

OTHER PUBLICATIONS

Extended European Search Report for European Patent Application No. 2294660.2, dated Mar. 17, 2025.

* cited by examiner

BARCODE SCANNING DEVICE FOR CYLINDRICAL SECONDARY BATTERY

TECHNICAL FIELD

Cross-Reference to Related Application

The present application claims the benefit of the priority of Korean Patent Application No. 10-2021-0174177, filed on Dec. 7, 2021, which is hereby incorporated by reference in its entirety.

TECHNICAL FIELD

The present invention relates to a barcode scanning device for a cylindrical secondary battery and, more specifically, to a barcode scanning device for a cylindrical secondary battery, having a wider scannable area so that a printed barcode may be quickly scanned without rotation of the cylindrical secondary battery (even when the barcode does not face a barcode scanner straight).

BACKGROUND ART

Secondary batteries, which are widely used in various digital devices and means of transportation such as vehicles, have characteristics capable of being repeatedly charged and discharged. In addition, research and development are continuously being conducted to increase efficiency and enhance safety.

Secondary batteries may be variously classified according to the shape of a battery case to which an electrode assembly is mounted or according to the material of the electrode assembly. When the secondary batteries are classified according to the shape of the battery case, cylindrical, prismatic, and pouch-type batteries are most widely manufactured.

Among these secondary batteries, the cylindrical secondary battery has a structure in which an electrode assembly and an electrolyte are embedded in a hollow cylindrical can with an open top, and then a top cap is coupled to an upper end of the can.

The electrode assembly is manufactured by winding a positive electrode, a separator, a negative electrode, and a separator, which are continuously supplied, from the center in a stacked state and then cutting the wound stack at a certain length. Also, the electrode assembly has a structure in which a positive electrode tab extending from the positive electrode protrudes upward and a negative electrode tab extending from the negative electrode protrudes downward. Then, when the electrode assembly is inserted into the can, the negative electrode tab on a lower side is welded to an upper surface of the bottom of the can, and the positive electrode tab on an upper side is connected to the top cap coupled to the upper end of the can to thereby manufacture the battery.

Also, in order to rapidly identify information such as manufacturers, capacities, production dates, production lines, etc., a barcode is directly printed on the cylindrical secondary battery manufactured as described above, or a barcode-printed label is attached thereto.

When this barcode is scanned to recognize product information during product inspection and packaging after the manufacturing process is completed, an appropriate process for each product is performed according to the scanned information.

Accordingly, accurate and rapid barcode scanning is required to prevent deterioration in efficiency of a production process.

Also, referring to FIG. 1 schematically illustrating a configuration of a scanning device according to the related art, the scanning device for a cylindrical secondary battery according to the related art has a structure in which a barcode reader 2 is located on an upper side in a state in which a cylindrical secondary battery 1 stands above reflecting plates 3a and 3b. When light emitted from an illuminator 4 is reflected from the reflecting plates 3a and 3b and then reflected from a barcode 1a of the cylindrical secondary battery 1, the barcode reader 2 receives the reflected light and recognizes the barcode 1a.

However, in the structure according to the related art, a problem may occur in scanning the barcode 1a depending on the position of the cylindrical secondary battery 1. That is, since an area, on which the barcode 1a is printed, in the cylindrical secondary battery 1 placed on the reflecting plate 3b is not placed in a constant state, an additional rotation of the cylindrical secondary battery 1 is often required to place this printed region in the correct position. In addition, even when the cylindrical secondary battery 1 is rotated, the light reflected from the reflecting plates 3a and 3b is not emitted to the front of the barcode 1a, but is emitted in an oblique direction from the bottom. Thus, it is not easy to adjust to the correct position.

In particular, as production equipment speeds up, the operation of additionally rotating the cylindrical secondary battery 1 may deteriorate the efficiency of the production process.

DISCLOSURE OF THE INVENTION

Technical Problem

Therefore, the main objective of the present invention is to provide a barcode scanning device for a cylindrical secondary battery, capable of rapidly recognizing a barcode irrespective of a direction and rotational position of the cylindrical secondary battery.

Technical Solution

A barcode scanning device for a cylindrical secondary battery to achieve the above objective is configured to scan a barcode positioned on a side surface of the cylindrical secondary battery, the barcode scanning device including: a barcode reader configured to scan a barcode by receiving light; an illuminator configured to emit the light; a first sub mirror located relatively close to the barcode reader and a second sub mirror located relatively close to the cylindrical secondary battery; and a main mirror configured to reflect, toward the barcode reader, the light which is reflected from the first sub mirror, wherein the second sub mirror is located at a position capable of receiving the light reflected from the side surface of the cylindrical secondary battery, and reflects the received light to the first sub mirror located close to the barcode reader.

The barcode reader may include a third sub mirror located relatively close to the barcode reader, and a fourth sub mirror located relatively close to the cylindrical secondary battery. The first sub mirror and the second sub mirror are arranged in a first pair on a first side of the cylindrical secondary battery, and the third sub mirror and the fourth sub mirror are arranged in a second pair on a second side of the cylindrical secondary battery opposite the first side.

The main mirror is located between the first pair and the second pair.

The main mirror has two reflective surfaces so that the light received from the first side and the second side are simultaneously emitted to the barcode reader.

The first sub mirror is located on the first side in a horizontal direction perpendicular to an extension direction of the barcode reader and the cylindrical secondary battery, the third sub mirror is located on the second side (in the horizontal direction perpendicular to the extension direction of the barcode reader and the cylindrical secondary battery, the second sub mirror is located on the first side in the horizontal direction, and the fourth sub mirror is located on the second side (in the horizontal direction.

The first pair and the second pair o are arranged symmetrically to each other.

At least two illuminators are spaced apart from each other.

Therefore, the at least two illuminators are arranged on opposite sides of the barcode reader, and may be respectively provided at a position closer to the first sub mirror than the second sub mirror in the extension direction (longitudinal direction) of the barcode reader and the cylindrical secondary battery and a position closer to the third sub mirror than the fourth sub mirror in the extension direction of the barcode reader and the cylindrical secondary battery.

Also, each of the first sub mirror, the second sub mirror, the third sub mirror, and the fourth sub mirror is individually adjustable in angle and position to adjust an angle of incidence and an angle of reflection.

A grip device ay be further provided, which adjusts the angles and positions of the first sub mirror and the second sub mirror so that the light emitted via the first sub mirror and the second sub mirror arrives at the side surface of the cylindrical secondary battery.

Advantageous Effects

According to the present invention having the above technical features, two sub mirrors and a main mirror are arranged on a path through which a barcode reader receives light reflected from a barcode. Accordingly, the light reflected from the barcode may arrive at the barcode reader more efficiently.

That is, since the sub mirrors are arranged to reflect light horizontally reflected from the barcode, a more accurate barcode image can be transmitted to the barcode reader without distortion. In addition, since the light reflected from the barcode may be transmitted in a wider area, an allowable angle range when the cylindrical secondary battery is placed may be increased.

Also, only one of the sub mirrors, which is located relatively close to the cylindrical secondary battery, is adjusted, and thus, the barcode may be scanned more easily.

A pair of sub mirrors may be arranged on each of both sides of the cylindrical secondary battery and scan both side surfaces of the cylindrical secondary battery. Accordingly, rotation of the cylindrical secondary battery is not required.

Furthermore, since the position and reflection angle of each of the sub mirrors may be individually adjusted, arrangement of an illuminator may be configured more freely.

In addition, in a structure according to the related art, it is difficult to obtain an image with uniform brightness due to reflection on the bottom surface. However, since reflection does not occur on the bottom surface in the present invention, an image with uniform brightness may be obtained.

MODE FOR CARRYING OUT THE INVENTION

Figure 1:
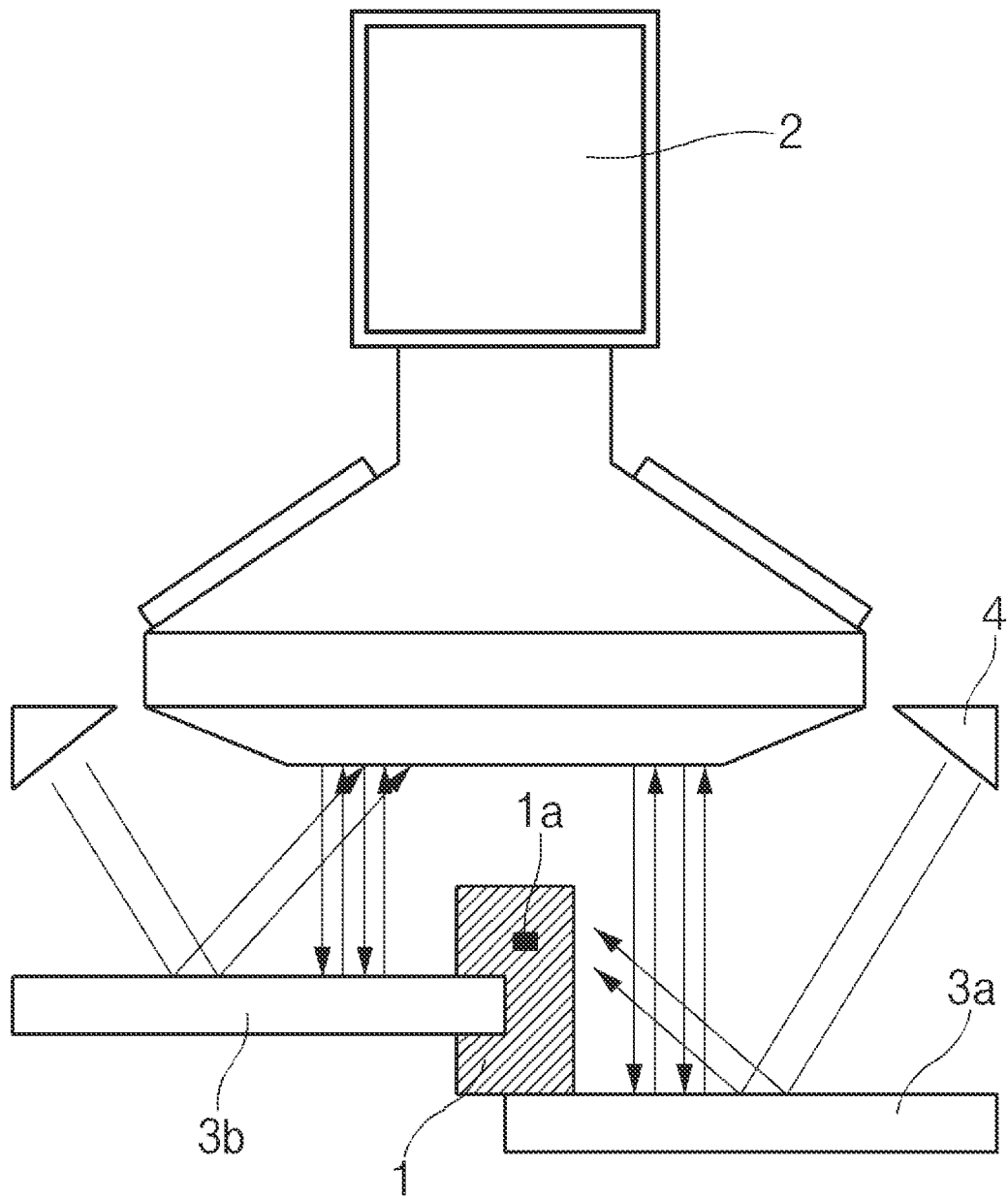
FIG. 1 is a view schematically illustrating a configuration of a scanning device for a cylindrical secondary battery according to the related art.

Hereinafter, embodiments of the present invention will be described in detail with reference to the accompanying drawings so that those skilled in the art can easily carry out the present invention. However, the present invention may be embodied in various different forms, and is not limited to the embodiments described herein.

A part irrelevant to the description will be omitted to clearly describe the present invention, and the same or similar elements will be designated by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a barcode scanning device for a cylindrical secondary battery that scans a barcode positioned on the side surface of a cylindrical secondary battery 1. Hereinafter, embodiments according to the present invention will be described in more detail with reference to the accompanying drawings.

Figure 2:
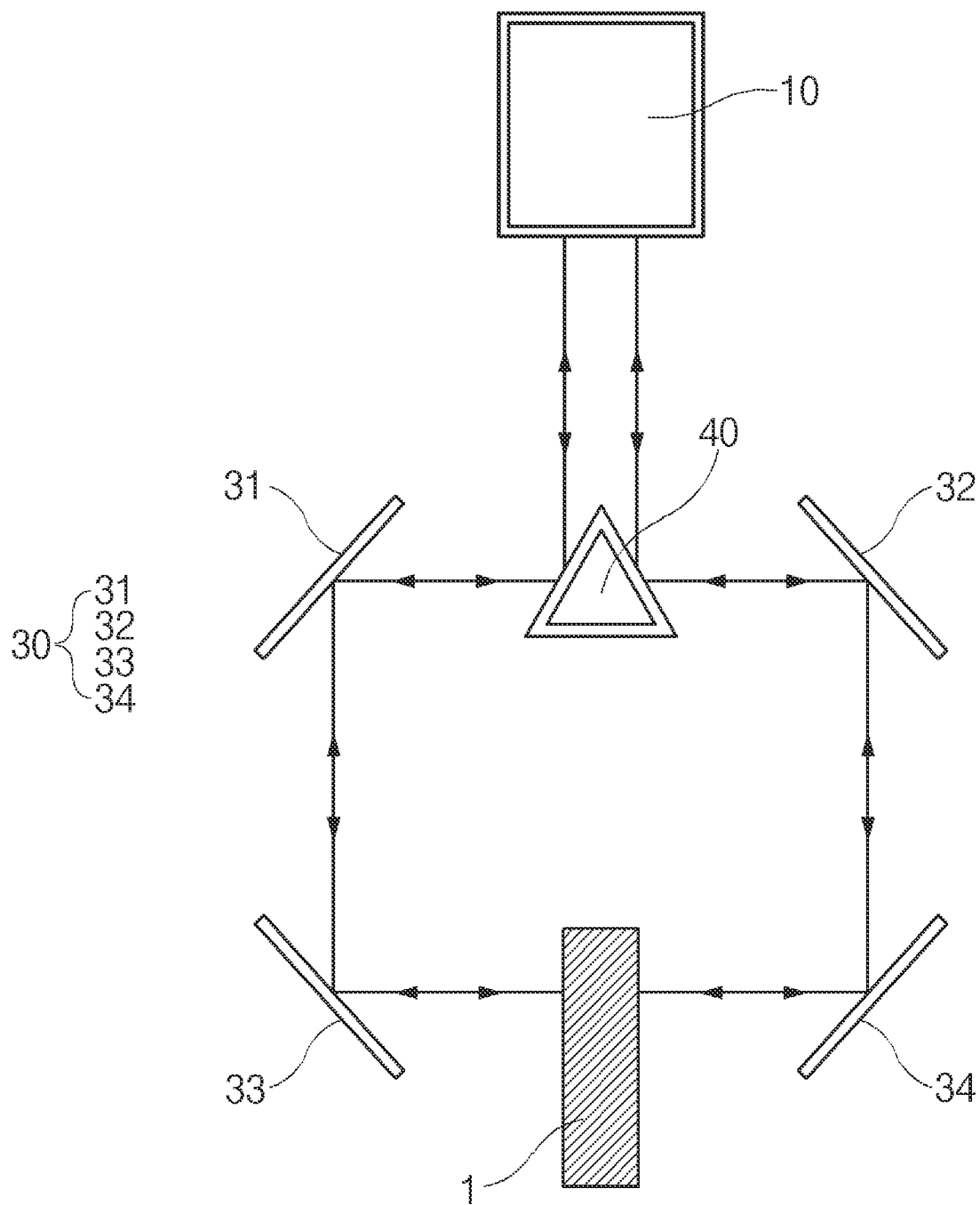
FIG. 2 is a view schematically illustrating configuration of a barcode scanning device for a cylindrical secondary battery according to the present invention.

Referring to FIG. 2 schematically illustrating a configuration of a barcode scanning device for a cylindrical secondary battery according to the present invention, the present invention includes an illuminator 20, a barcode reader 10, two or more sub mirrors 30, and a main mirror 40.

When a cylindrical secondary battery 1 stands vertically, one or more sub mirrors 30 are located relatively close to the cylindrical secondary battery 1, and another one or more are located relatively close to the barcode reader 10.

At least two sub mirrors 30 are arranged in the present invention, but preferably four are arranged in two pairs as illustrated in the drawing.

That is, the sub mirrors 30 include a first sub mirror 31, which is provided between the barcode reader 10 and the cylindrical secondary battery 1 and located on one side (i.e., the upper left side in FIG. 2) in a horizontal direction perpendicular to an extension direction (the longitudinal direction of the cylindrical secondary battery, the up-down direction in FIG. 2) of the barcode reader 10 and the cylindrical secondary battery 1, and a second sub mirror 32, which is provided between the barcode reader 10 and the cylindrical secondary battery 1 and located on the other side (i.e., the upper right side in FIG. 2) in the horizontal direction perpendicular to the extension direction of the barcode reader 10 and the cylindrical secondary battery 1.

In addition, a third sub mirror 33 and a fourth sub mirror 34 are further provided so as to be vertically symmetrical with the first sub mirror 31 and the second sub mirror 32.

That is, the third sub mirror 33 is provided on the one side (i.e., the lower left side in FIG. 2) in the horizontal direction the same as the first sub mirror 31 and located next to the cylindrical secondary battery 1, and the fourth sub mirror 34 is provided on the other side (i.e., the lower right side in FIG. 2) in the horizontal direction the same as the second sub mirror 32 and located next to the cylindrical secondary battery 1.

The first sub mirror 31 and the third sub mirror 33 are paired on one side (the left side of FIG. 2) of the cylindrical secondary battery 1 and transmit reflected light to the main mirror 40, and the second sub mirror 32 and the fourth sub mirror 34 are paired on the other side (the right side of FIG. 2) of the cylindrical secondary battery 1 and transmit reflected light to the main mirror 40.

Also, here, the pair of the first sub mirror 31 and the third sub mirror 33 is arranged symmetrically to the pair of the second sub mirror 32 and the fourth sub mirror 34.

Therefore, the third sub mirror 33 and the fourth sub mirror 34 arranged relatively close to the cylindrical secondary battery 1 may face each other at the same height as the barcode of the cylindrical secondary battery 1.

When the third sub mirror 33 and the fourth sub mirror 34 receive and reflect the light reflected from the barcode, the first sub mirror 31 or the second sub mirror 32 located relatively close to the barcode reader 10 receives the light and reflects the same to the main mirror 40. Here, according to the position of the illuminator 20, the light emitted from the illuminator 20 may be transmitted to the barcode from the first sub mirror 31 and the second sub mirror 32 via the third sub mirror 33 and the fourth sub mirror 34 or, the light of the illuminator 20 may be directly emitted to the barcode via the third sub mirror 33 and the fourth sub mirror 34 without arriving at the first sub mirror 31 and the second sub mirror 32.

The main mirror 40 is located between the first sub mirror 31 and the second sub mirror 32 so as to receive the light from both the first sub mirror 31 and the second sub mirror 32. That is, the main mirror 40 has two reflective surfaces so that the light received from both sides is simultaneously emitted to the barcode reader 10. Accordingly, the light transmitted from each of the first sub mirror 31 and the second sub mirror 32 is transmitted to the barcode reader 10 via the main mirror 40.

The barcode reader 10 recognizes information by receiving the transmitted light and scanning the barcode.

Therefore, according to the present invention, the sub mirrors 33 and 34 arranged close to the cylindrical secondary battery 1 reflect light to the sub mirrors 31 and 32 arranged close to the barcode reader 10 or the main mirror 40, and the reflected light is finally transmitted to the barcode reader 10 via the main mirror 40.

As illustrated in FIG. 2, the sub mirrors 30, the main mirror 40, and the barcode reader 10 are arranged to stand in a vertical direction (in the up-down direction) in a state in which the cylindrical secondary battery 1 stands. Accordingly, while the cylindrical secondary battery 1 moves in a direction from a region coming out of a drawing (based on FIG. 2) to the inside of the drawing, the barcode reader 10 may scan the barcode at the moment when the cylindrical secondary battery 1 is positioned between the third sub mirror 33 and the fourth sub mirror 34.

On the other hand, according to the movement path and arrangement position of the cylindrical secondary battery 1, the sub mirrors 30, the main mirror 40, and the barcode reader 10 may be arranged in a horizontal direction perpendicular to a state in which the cylindrical secondary battery 1 stands.

Figure 3:
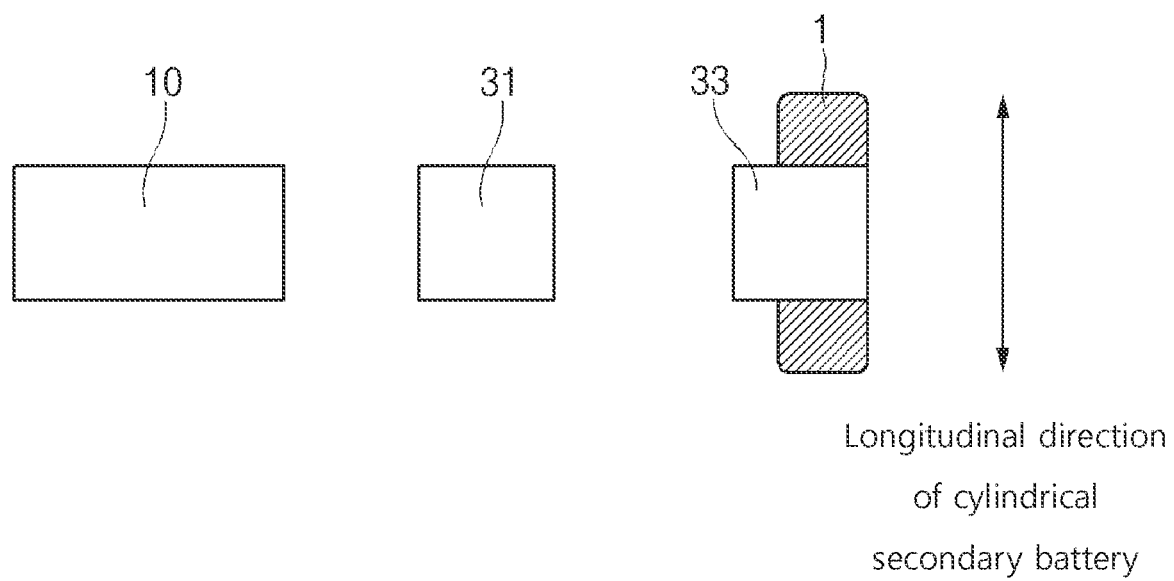
FIG. 3 is a view schematically illustrating a state in which a cylindrical secondary battery is positioned to stand and a scanning device is arranged in a horizontal direction (perpendicular to a longitudinal direction of the cylindrical secondary battery).

As shown in FIG. 3 schematically illustrating a state in which a cylindrical secondary battery 1 is positioned to stand and a scanning device is arranged in a horizontal direction, the scanning device provided in the present invention may provide, as another embodiment, a structure arranged in the horizontal direction so as to be perpendicular to the longitudinal direction of the cylindrical secondary battery. For reference, FIG. 3 is the same as a view that is viewed from the left side when the scanning device illustrated in FIG. 2 is laid at a right angle of 90 degrees.

Therefore, the scanning device according to the present invention may be located with respect to the cylindrical secondary battery 1 irrespective of orientation. Even when the scanning device is arranged in the horizontal direction as described above, the light reflected from the barcode is transmitted to the barcode reader 10 by adjusting the heights, angles, positions, etc. of the sub mirrors 30 and the main mirror 40. For example, when the scanning device is arranged in the vertical direction as shown in FIG. 2, the cylindrical secondary battery 1 may be scanned even when provided in a laid-down state (not in a standing state as in FIG. 2).

Figure 4:
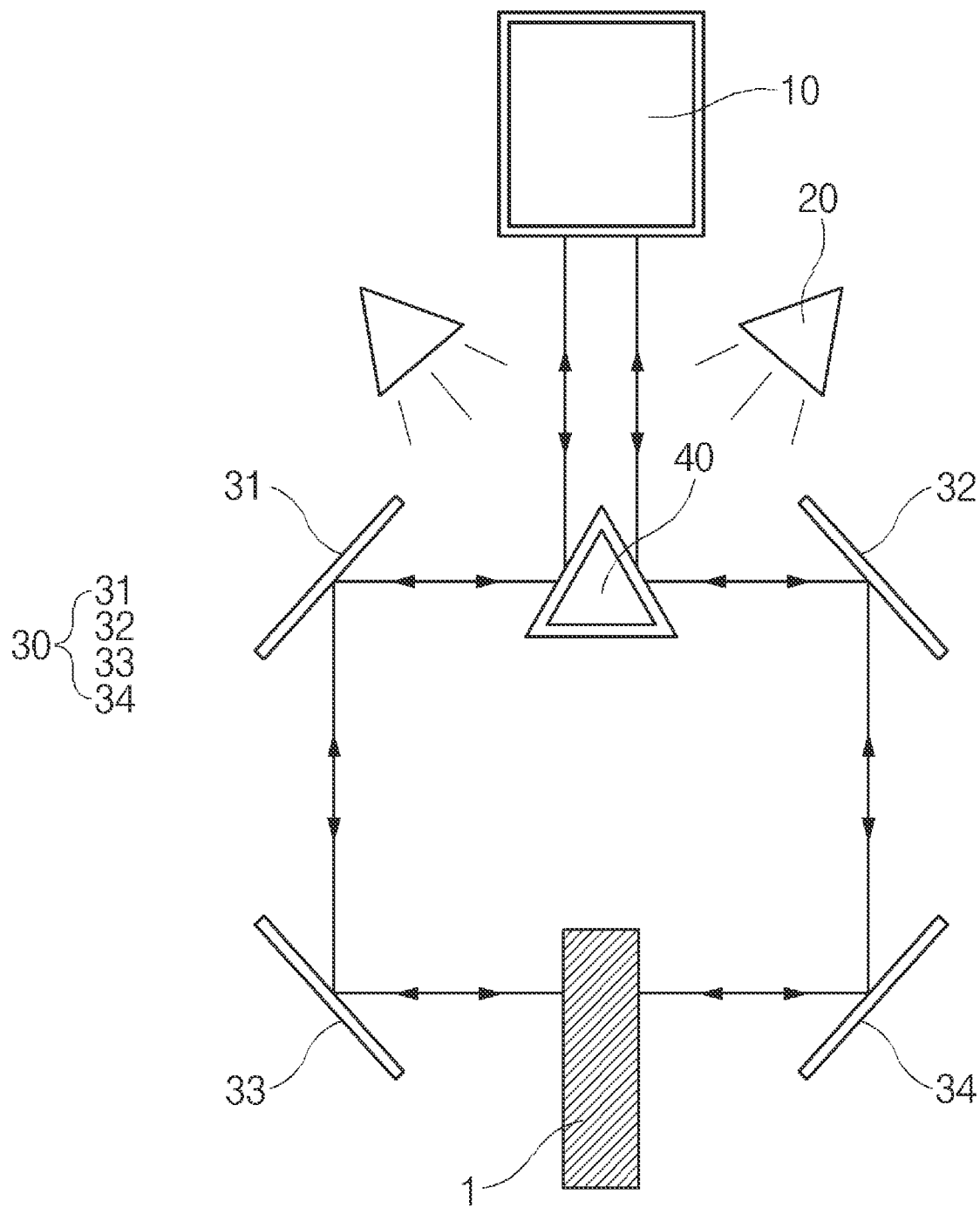
FIG. 4 is a view showing a state in which illuminators are arranged above a first sub mirror and a second sub mirror in a state of FIG. 2.
Figure 5:
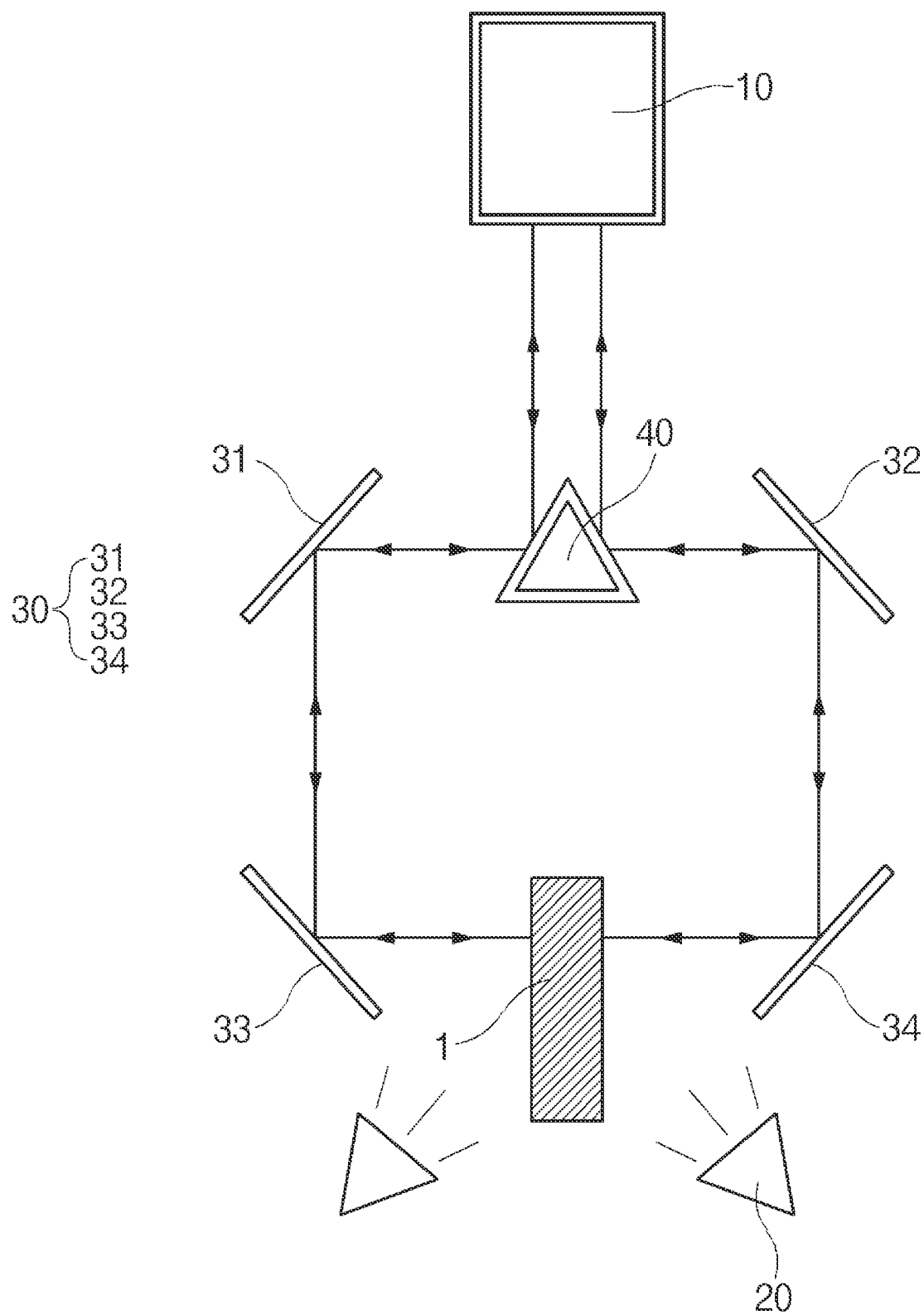
FIG. 5 is a view showing a state in which illuminators are arranged below a third sub mirror and a fourth sub mirror in a state of FIG. 2.
Figure 6:
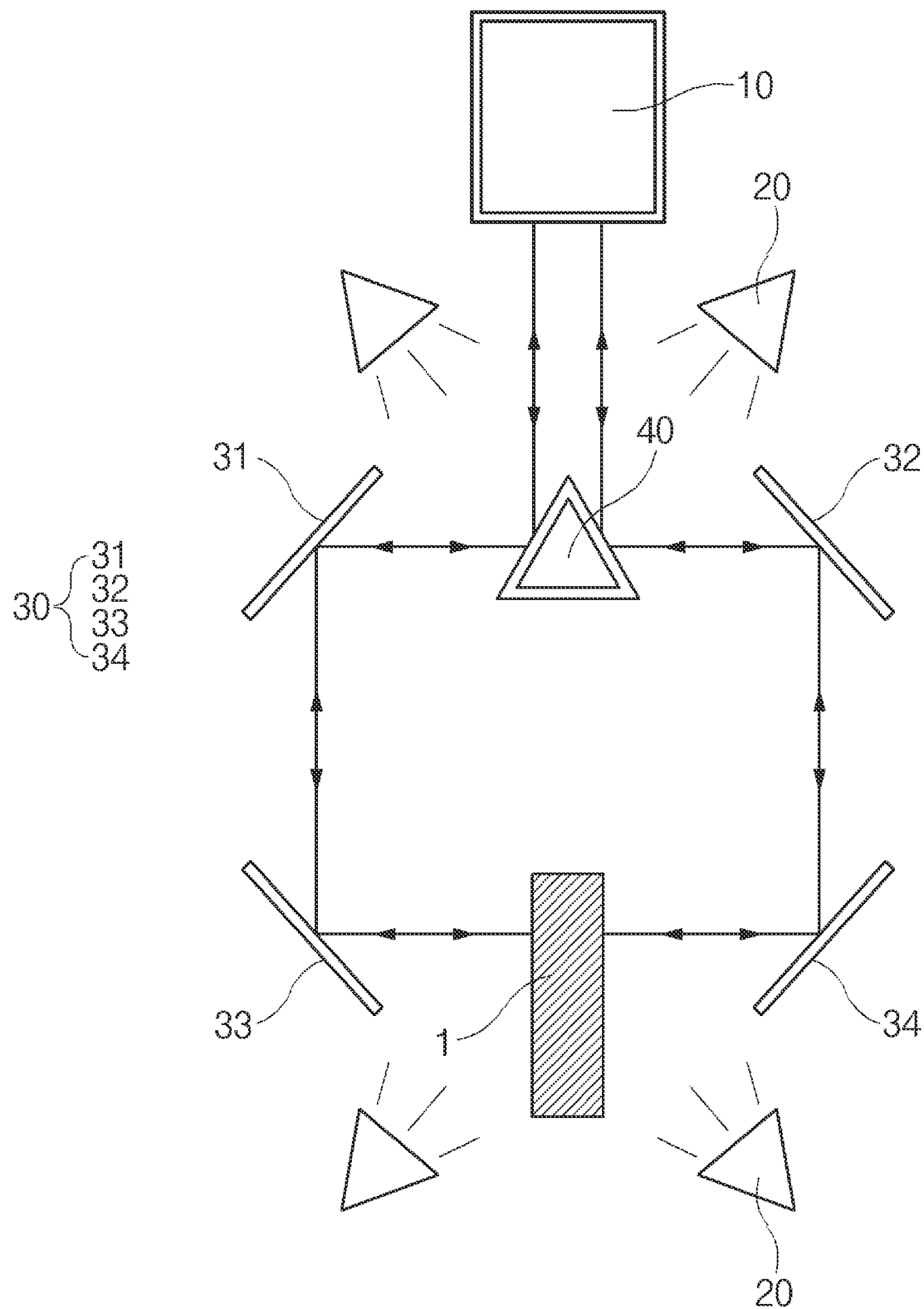
FIG. 6 is a view showing a state in which illuminators are arranged above a first sub mirror and a second sub mirror and below a third sub mirror and a fourth sub mirror in a state of FIG. 2.
Figure 7:
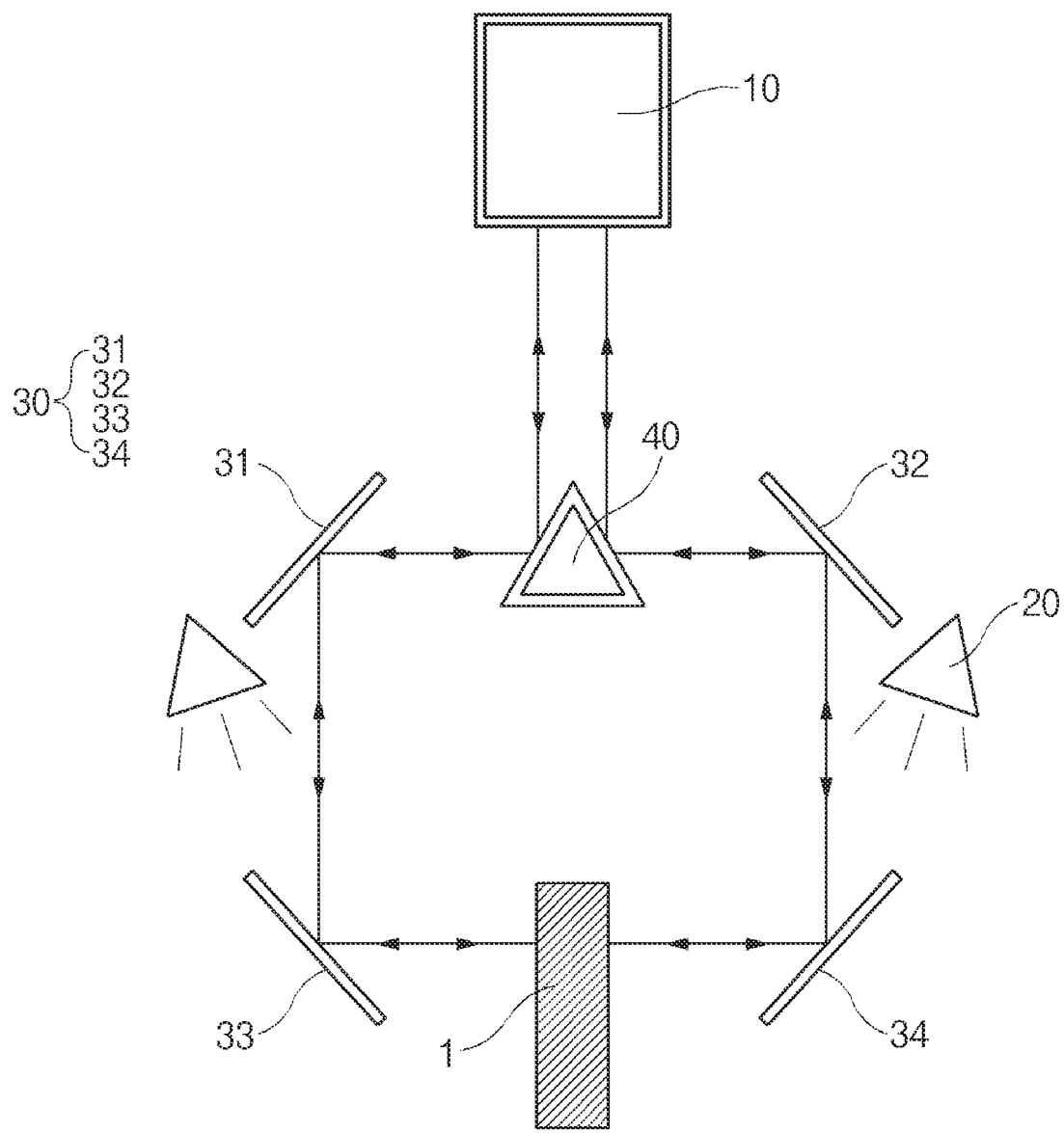
FIG. 7 is a view showing a state in which illuminators are arranged above a third sub mirror and a fourth sub mirror while being below a first sub mirror and a second sub mirror in a state of FIG. 2.

FIG. 4 is a view showing a state in which illuminators 20 are arranged above a first sub mirror 31 and a second sub mirror 32 in a state of FIG. 2, FIG. 5 is a view showing a state in which illuminators 20 are arranged below a third sub mirror 33 and a fourth sub mirror 34 in a state of FIG. 2, FIG. 6 is a view showing a state in which illuminators 20 are arranged above a first sub mirror 31 and a second sub mirror 32 and below a third sub mirror 33 and a fourth sub mirror 34 in a state of FIG. 2, and FIG. 7 is a view showing a state in which illuminators 20 are arranged above a third sub mirror 33 and a fourth sub mirror 34 while being below a first sub mirror 31 and a second sub mirror 32 in a state of FIG. 2.

As described above, the barcode scanning device for the cylindrical secondary battery 1 according to the present invention may be arranged irrespective of the orientation of the cylindrical secondary battery 1, and thus, the illuminators 20 emitting light may be more freely arranged.

That is, as indicated by arrows in the drawings, the light is reflected not in one direction but in both directions, between the neighboring sub mirrors 30, between the sub mirrors 30 and the main mirror 40, and between the main mirror 40 and the barcode reader 10.

Accordingly, as illustrated in FIGS. 4, 5, and 7, the illuminators 20 emitting light may be arranged in various positions, and various numbers of illuminators may be provided. However, it is preferable that at least two or more illuminators 20 be symmetrically spaced apart from each other so that light may be uniformly emitted to the sub mirrors on both sides.

That is, the illuminators 20 may be arranged on one of the upper and lower sides of the sub mirrors 30 as shown in FIG. 4, in which the illuminators are arranged above the first sub mirror 31 and the second sub mirror 32, and FIG. 5, in which the illuminators are arranged below the third sub mirror 33 and the fourth sub mirror 34. In addition, the illuminators may be arranged on both the upper and lower sides as shown in FIG. 6, and may be arranged between the upper sub mirrors 31 and 32 and the lower sub mirrors 33 and 34 as shown in FIG. 7.

In addition, as long as light may be emitted to the sub mirrors 30, the illuminators 20 may be arranged in a region in a direction entering the drawing and a region in a direction exiting the drawing based on FIG. 4.

Therefore, in order to emit light to the barcode according to the number and arrangement of the illuminators 20, each of the first sub mirror 31, the second sub mirror 32, the third sub mirror 33, and the fourth sub mirror 34 is individually adjustable in angle and position to adjust an angle of incidence and an angle of reflection.

A grip device (not shown) may be further provided to individually adjust the angles and positions of the sub mirrors 30. The grip device may be configured not only to adjust the sub mirrors 30, but also to adjust the orientation of the cylindrical secondary battery 1.

The grip device may be configured to adjust the angles and positions of the sub mirrors by physically applying pressure to the sub mirrors. In addition, when sub mirrors are configured to be able to move by themselves, the grip device may be provided in the form of software to control and adjust the orientation of the sub mirrors according to a sensor recognizing the illuminators and the received light.

According to the present invention having the above technical features, two sub mirrors and a main mirror are arranged on a path through which a barcode reader 10 receives light reflected from a barcode. Accordingly, the light reflected from the barcode may arrive at the barcode reader more efficiently.

That is, since the sub mirrors are arranged to reflect light horizontally reflected from the barcode, a more accurate barcode image can be transmitted to the barcode reader without distortion. In addition, since the light reflected from the barcode may be transmitted in a wider area, an allowable angle range when the cylindrical secondary battery is placed may be increased.

Also, only one of the sub mirrors, which is located relatively close to the cylindrical secondary battery, is adjusted, and thus, the barcode may be scanned more easily.

A pair of sub mirrors may be arranged on each of both sides of the cylindrical secondary battery and scan both side surfaces of the cylindrical secondary battery. Accordingly, rotation of the cylindrical secondary battery is not required.

In addition, in a structure according to the related art, it is difficult to obtain an image with uniform brightness due to reflection on the bottom surface. However, since reflection does not occur on the bottom surface in the present invention, an image with uniform brightness may be obtained.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

10: Barcode reader
20: Illuminator
30: Sub mirror (31: First sub mirror, 32: Second sub mirror, 33: Third sub mirror, 34: Fourth sub mirror)
40: Main mirror

The invention claimed is:

1. A barcode scanning device for a cylindrical secondary battery, the barcode scanning device being configured to scan a barcode positioned on a side surface of the cylindrical secondary battery, the barcode scanning device comprising:
   an illuminator configured to emit light;
   a barcode reader configured to scan the barcode by receiving the light;
   a first sub mirror located relatively close to the barcode reader;
   a second sub mirror located relatively close to the cylindrical secondary battery; and
   a main mirror configured to reflect, toward the barcode reader, the light which is reflected from the first sub mirror,
   wherein the second sub mirror is located at a position capable of receiving the light reflected from the side surface of the cylindrical secondary battery, and reflects the received light to the first sub mirror located close to the barcode reader.

2. The barcode scanning device of claim 1, further comprising:
   a third sub mirror located relatively close to the barcode reader; and
   a fourth sub mirror located relatively close to the cylindrical secondary battery,
   wherein the first sub mirror and the second sub mirror are arranged in a first pair on a first side of the cylindrical secondary battery, and
   wherein the third sub mirror and the fourth sub mirror are arranged in a second pair on a second side of the cylindrical secondary battery opposite the first side.

3. The barcode scanning device of claim 2, wherein the main mirror is located between the first pair and the second pair.

4. The barcode scanning device of claim 3, wherein the main mirror has two reflective surfaces so that the light received from the first side and the second side are simultaneously emitted to the barcode reader.

5. The barcode scanning device of claim 3,
   wherein the first sub mirror is located on the first side in a horizontal direction perpendicular to an extension direction of the barcode reader and the cylindrical secondary battery,
   wherein the third sub mirror is located on the other second side in the horizontal direction perpendicular to the extension direction of the barcode reader and the cylindrical secondary battery,
   wherein the second sub mirror is located on the first side in the horizontal direction, and
   wherein the fourth sub mirror is located on the second side in the horizontal direction.

6. The barcode scanning device of claim 5, wherein the first pair and the second pair are arranged symmetrically to each other.

7. The barcode scanning device of claim 5, further comprising at least two illuminators spaced apart from each other.

8. The barcode scanning device of claim 7, wherein the at least two illuminators are located on opposite sides of the barcode reader, and respectively provided at a position closer to the first sub mirror than the second sub mirror in the extension direction of the barcode reader and the cylindrical secondary battery and a position closer to the third sub mirror than the fourth sub mirror in the extension direction of the barcode reader and the cylindrical secondary battery.

9. The barcode scanning device of claim 5, wherein each of the first sub mirror, the second sub mirror, the third sub mirror, and the fourth sub mirror is individually adjustable in angle and position to adjust an angle of incidence and an angle of reflection.

10. The barcode scanning device of claim 1, further comprising a grip device configured to adjust angles and positions of the first sub mirror and the second sub mirror so that the light emitted via the first sub mirror and the second sub mirror arrives at the side surface of the cylindrical secondary battery.

\* \* \* \* \*